(12) United States Patent
Alag et al.

(10) Patent No.: US 6,363,330 B1
(45) Date of Patent: Mar. 26, 2002

(54) THERMOCOUPLE FAILURE DETECTION IN POWER GENERATION TURBINES

(76) Inventors: Satnam Singh Sampuran Alag, 500 Manson Ct., Apt. 110, Santa Clara, CA (US) 95054; Mahesh Amritlal Morjaria, 830 Downing St., Niskayuna, NY (US) 12309

(*) Notice: Subject to any disclaimer, the term of this patent is extended or adjusted under 35 U.S.C. 154(b) by 0 days.

(21) Appl. No.: 09/169,334

(22) Filed: Oct. 9, 1998

Related U.S. Application Data (60) Provisional application No. 60/081,476, filed on Apr. 10, 1998.

(51) Int. Cl.$^7$ ................................................ G06F 15/46
(52) U.S. Cl. ........................ 702/132; 702/130; 702/131; 700/287; 236/153 B
(58) Field of Search ................................ 702/130, 131, 702/132; 236/158 B; 374/179; 290/40 R, 4 R, 40 B; 700/287; 60/39.281

(56) References Cited

U.S. PATENT DOCUMENTS

| | | | |
|---|---|---|---|
| 4,283,634 A | * 8/1981 | Yannone et al. | 290/40 R |
| 4,377,000 A | 3/1983 | Staab | 371/11 |
| 4,402,054 A | 8/1983 | Osborne et al. | 364/554 |
| 4,517,468 A | 5/1985 | Kemper et al. | 290/52 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,654,846 A | 3/1987 | Goodwin et al. | 371/8 |
| 4,841,209 A | 6/1989 | Poumakis | 318/564 |
| 4,951,234 A | 8/1990 | Bellows | 364/550 |
| 5,009,833 A | 4/1991 | Takeuchi et al. | 376/217 |
| 5,081,598 A | 1/1992 | Bellows et al. | 364/550 |
| 5,086,499 A | 2/1992 | Mutone | 364/200 |
| 5,089,978 A | 2/1992 | Lipnet et al. | 364/551.01 |
| 5,121,496 A | 6/1992 | Harper | 395/600 |
| 5,122,976 A | 6/1992 | Bellows et al. | 364/550 |
| 5,132,920 A | 7/1992 | Bellows et al. | 364/551 |
| 5,164,912 A | 11/1992 | Osborne et al. | 364/580 |
| 5,168,854 A | 12/1992 | Hashimoto et al. | 123/425 |
| 5,170,780 A | 12/1992 | Rosenfeld | 128/731 |
| 5,255,149 A | 10/1993 | Matsuo | 361/103 |
| 5,255,208 A | 10/1993 | Thakore et al. | 364/551.01 |
| 5,307,409 A | 4/1994 | Driscoll | 380/2 |
| 5,311,562 A | 5/1994 | Palusamy et al. | 376/215 |
| 5,331,579 A | 7/1994 | Maguire, Jr. et al. | 364/578 |
| 5,351,200 A | 9/1994 | Impink, Jr. | 364/550 |
| 5,359,532 A | 10/1994 | Akasaka | 364/476 |
| 5,390,326 A | 2/1995 | Shah | 395/575 |
| 5,485,491 A | 1/1996 | Salnick et al. | 376/245 |
| 5,499,023 A | 3/1996 | Goldschmidt | 340/870.37 |
| 5,550,751 A | 8/1996 | Russell | 364/492 |
| 5,586,156 A | 12/1996 | Gaubatz | 376/216 |
| 5,663,899 A | 9/1997 | Zvonar et al. | 364/557 |
| 5,680,541 A | 10/1997 | Kurosu et al. | 395/183.02 |

FOREIGN PATENT DOCUMENTS

FR     2673288     8/1992

\* cited by examiner

*Primary Examiner*—Kamini Shah (57) ABSTRACT

A method of thermocouple failure detection in power generation turbines first comprises creating redundancy estimates from temperature readings generated by thermocouples. Next, an expected value is predicted from each temperature reading. The temperature readings and the redundancy estimates are compared with the expected value. Next, the redundancy estimates and the expected values are fused to generate a fused thermocouple value. Finally, a thermocouple confidence is generated by comparing the fused thermocouple value and the temperature readings.

39 Claims, 8 Drawing Sheets fig. 1 fig. 2 fig 3 fig. 4 fig. 5 fig. 6 fig. 7 fig. 8

THERMOCOUPLE FAILURE DETECTION IN POWER GENERATION TURBINES

This application claims priority of a Provisional Application titled "Thermocouple Failure Detection in Power Generation Turbines," by Morjaria and Alag, Serial No. 60/081,476, filed Apr. 10, 1998.

BACKGROUND OF THE INVENTION

The present invention relates generally to industrial turbine engines, and more specifically, to thermocouple failure detection therein.

Industrial power generation gas turbine engines include a compressor for compressing air that is mixed with fuel and ignited in a combustor for generating combustion gases. The combustion gases flow to a turbine that extracts energy for driving a shaft to power the compressor and produces output power for powering an electrical generator, for example. The turbine is typically operated for extended periods of time at a relatively high base load for powering the generator to produce electrical power to a utility grid, for example. Exhaust emissions from the combustion gases are therefore a concern and are subjected to mandated limits.

Gas turbine combustors are being developed which employ lean premixed combustion to reduce emissions of gases such as $NO_x$ (nitrogen oxides). One such combustor comprises a plurality of burners attached to a single combustion chamber. Each burner includes a flow tube with a centrally disposed fuel nozzle comprising a center hub which supports fuel injectors and swirl vanes. During operation, fuel is injected through the fuel injectors and mixes with the swirling air in the flow tube, and a flame is produced at the exit of the burner. The combustion flame is stabilized by a combination of bluffbody recirculation behind the center hub and swirl-induced recirculation. Because of the lean stoichiometry, lean premixed combustion achieves lower flame temperature and thus produces lower $NO_x$ emissions.

These premixed systems, however, are susceptible to an unpredictable phenomena commonly referred to as "flashback." Flashbacks can be caused by any of a number of events, including ignition of impurities in fuel or ignition during mode switching when the flames are in a transient phase. When flashback occurs, a flame enters zones or cavities of the combustor chamber which may not be designed to contain flames. A flame can also move unexpectedly into combustor cavities specified for firing modes other than the combustion mode being exercised at the time of the flashback occurrence. Both types of flashback occurrences result in a loss of combustion control and can additionally cause heating and melting of combustor parts, such as fuel nozzles, for example, that are not designed to withstand excessive heating. An operator generally has no method of recognizing the occurrence of a flashback until the combustor sustains damage.

An event monitor may be implemented that attempts to detect flashback events and severe crack events by monitoring exhaust thermocouple readings and the associated NOx values. This method has been shown to be effective. A deviation of a thermocouple reading from the expected, however, can also be due to a thermocouple failure. Accordingly, for an event monitor to be accurate, it is necessary to distinguish between a thermocouple failure and a flashback event or liner crack event.

Therefore, it is apparent from the above that there exists a need in the art for a method of detecting failed exhaust thermocouples in a power turbine.

SUMMARY OF THE INVENTION

A method of thermocouple failure detection in power generation turbines first comprises creating redundancy estimates from temperature readings generated by thermocouples. Next, an expected value is predicted from each temperature reading. The temperature readings and the redundancy estimates are compared with the expected value. Next, the redundancy estimates and the expected values are fused to generate a fused thermocouple value. Finally, a thermocouple confidence is generated by comparing the fused thermocouple value and the temperature readings.

DETAILED DESCRIPTION OF THE INVENTION

Figure 1:
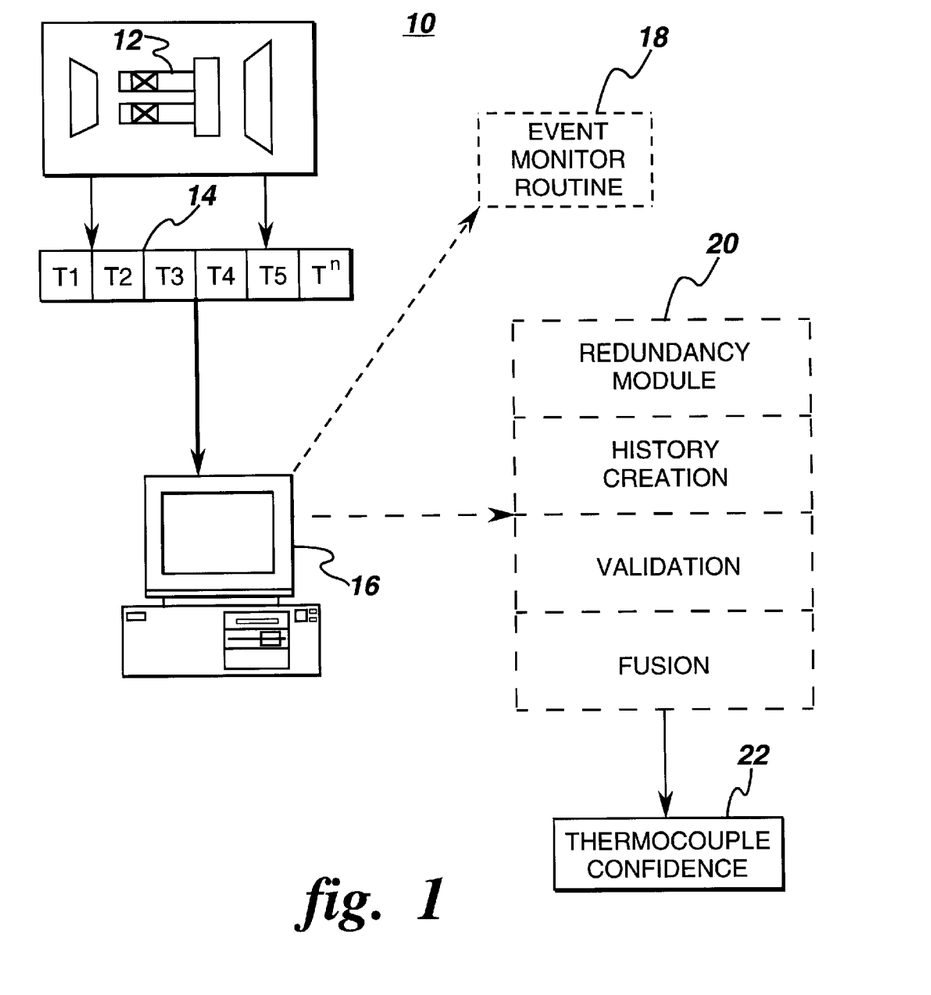
FIG. 1 is a schematic illustration of a thermocouple failure detection system in accordance with one embodiment of the instant invention.

A thermocouple failure detection system 10 for a power generation turbine assembly 12 is shown in FIG. 1.

Thermocouple failure detection system 10 comprises a plurality of thermocouples 14 positioned to monitor temperature within turbine assembly 12, which thermocouples 14 are coupled to a computer 16.

In operation, as discussed in greater detail below, thermocouples 14 generate temperature signals that correspond to temperatures within turbine assembly 12. The temperature signals are provided to computer 16 and are utilized within an event monitor software routine 18 and within an algorithm 20, as shown and discussed in greater detail in FIG. 2, which algorithm 20 is embedded in computer 16 to generate a thermocouple confidence value 22, which value 22 provides an indication of thermocouple operation or alternatively thermocouple failure.

Event monitor software routine 18 is provided for detecting flashback events and severe liner crack events and is embedded in computer 16. Event monitor software routine 18 monitors the temperature signals generated by thermocouples 14 and NOx values measured by other sensors (not shown). Should event monitor software routine 18 detect a significant temperature deviation with respect to the temperature signals generated or measured by a respective thermocouple 14, typically between about 5° F. to about 10°

F. from an expected thermocouple temperature reading, an abnormal event is detected and appropriate corrections are taken, for example a system shutdown occurs.

As discussed above, failure to correctly distinguish between a respective thermocouple 14 failure and a flashback or a liner crack event could lead to false abnormal event readings or missed flashback or liner crack event. Accordingly, it is essential that thermocouple temperature readings are validated.

A number of factors make the process of thermocouple data validation and thermocouple failure detection difficult. First and most importantly, thermocouple failures can be masked by normal system transients or deviations. This could be due, for example, to changes in the operating conditions during a load change. Furthermore, the physical imperfections of the thermocouples add noise to thermocouple readings and thermocouples are prone to drift over time. Drift is a gradual change in the difference between measured and actual temperatures caused by thermocouple aging and connection degradation. Additionally, a flashback or a liner crack event can cause changes in thermocouple readings that mimic the changes caused by a failed thermocouple.

Thermocouples fail or become faulty for many reasons. An abrupt failure to a thermocouple may be caused by a power failure or surge, loose or corroded contacts, or flaws or limitations in the data acquisition or processing system. An incipient thermocouple failure such as a drift in the thermocouple (e.g., caused by deterioration in the sensing element) is typically more difficult to detect. Although the problem of incipient failures has received little attention, the detection of incipient failures as well as abrupt failures is extremely important for thermocouples 14 that provide critical information with respect to event monitor software routine 18. These failures need to be detected and predicted before they have catastrophic consequences.

The conventional method for detecting thermocouple failures is to check the consistency of the redundant measurements of selected process variables, estimate their expected values from measurements, and detect, isolate, and characterize the type of anomaly in the measurement channel output.

Figure 2:
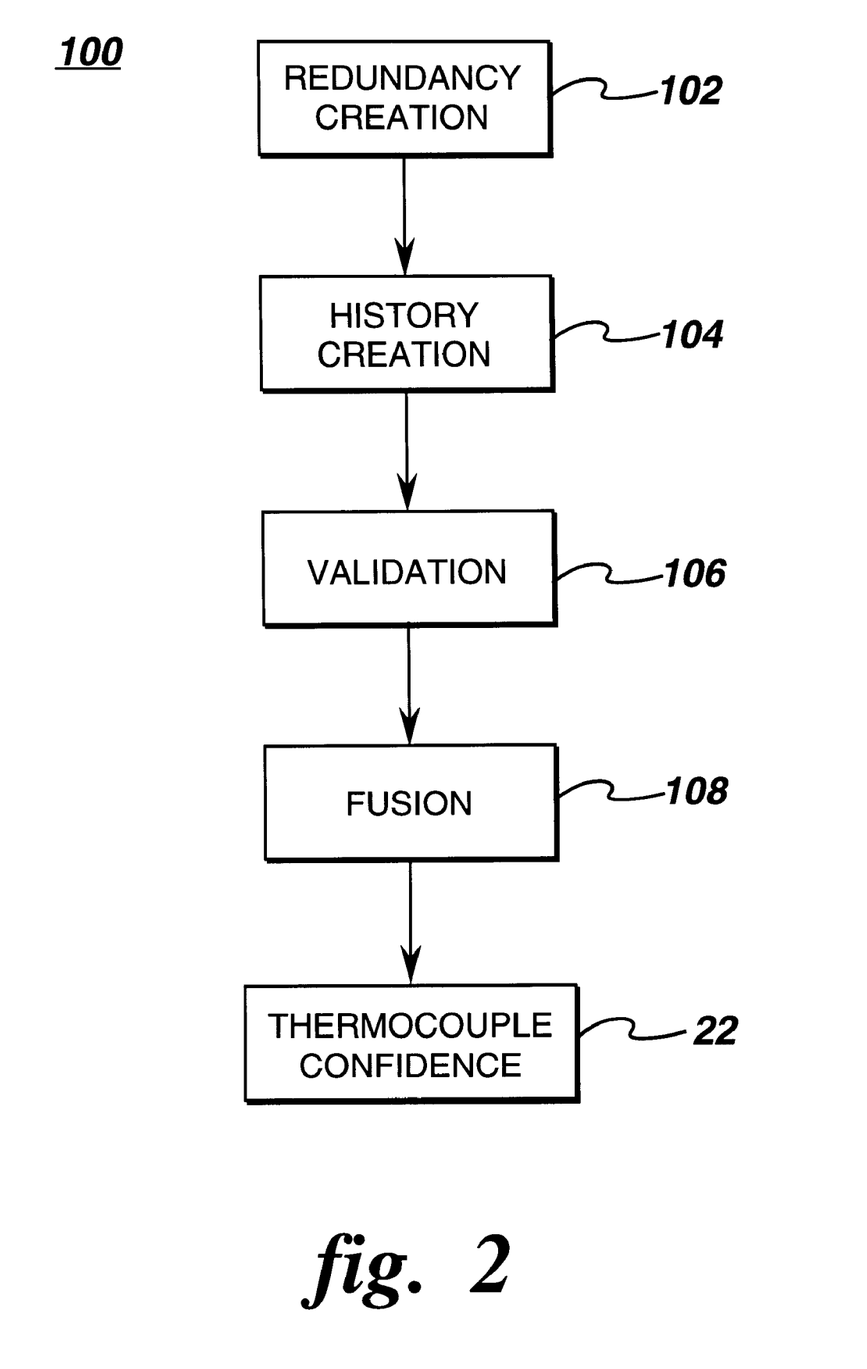
FIG. 2 is a flow chart depicting method steps in accordance with one embodiment of the instant invention.

In accordance with one embodiment of the instant invention, a method for detecting thermocouple failure in power generation turbines is depicted in flow chart 100 of FIG. 2. In this invention, the method is typically embedded in the form of an algorithm in one or more computer 16 (FIG. 1), such as a workstation. Other types of computers can be used, however, such as a mainframe, a microcomputer, a minicomputer, or a supercomputer. The algorithm may be performed in C, C++, JAVA, basic, Visual Basic, MATLAB, Fortran or other programming languages.

In one embodiment of the instant invention, method for detecting thermocouple failure in power generation turbines 100 generally consists of redundancy creation 102, history creation 104, validation 106 and fusion 108.

At step 102, redundancy in temperature signals generated from thermocouples 14 (FIG. 1) is created. Next, at step 104, a time-series prediction model is utilized to predict the expected temperature value for each thermocouple 14 (FIG. 1) using the history of the process. Next, in step 106, the temperature signals from thermocouples 14 (FIG. 1) are compared to the predicted temperature values to validate the readings. Finally, the validated readings are fused into a fused estimate at 108 and a thermocouple confidence 22 is generated by computer 16 (FIG. 1) for a respective thermocouple 14.

Redundancy is the process of creating multiple independent estimates for the quantity being measured. Installing multiple sensors to estimate the same variable is an example of redundancy. Broadly, the process of redundancy creation can be divided into two main processes: (1) physical redundancy, where multiple physical thermocouples are used to provide redundant information; and (2) functional redundancy, in which redundant estimates are generated using measurements from non-redundant thermocouples. There is a function that transforms the non-redundant estimates to another estimate—redundant—for the thermocouple reading.

The functional redundancy creation process can be represented mathematically as follows: Let $\{y_1, y_2, ---y_n\}$ be measurements from n thermocouples measuring temperatures at the point where they are located. Let their states be $\{x_1, x_2, ---x_n\}$. The temperature measurement $y_i$ provides an estimate for the temperature at which it is located, $x_i\}$. Here, $y(k)=x(k)+v(k)$ where $v(k)$ is measurement noise. Now, the goal is to develop a redundant estimate for $x_i$ using $\{y_1, ---y_{i-1}, y_{i+1}, ---y_n\}$. Therefore, the functional relationship $f$ needs to be found where $$x_i f(y_1, ---y_{i-1}, y_{i+1}, ---y_n)$$

In general this is a mapping or function approximation problem which is solved using one of three methods: non-linear regression, neural networks or an analytical first principles model.

Functionally, redundant estimates for the thermocouple readings are created at step 102 by considering the temperature estimates provided by two adjoining thermocouples one on either side of the at-issue thermocouple, for example T2 and T4 of FIG. 1 if T3 were the at-issue thermocouple 14. This is a fairly simple function that gives good results. A flashback or a liner-crack event will typically affect at least two adjoining thermocouples, while a thermocouple failure affects only an isolated thermocouple 14 reading. Here, The temperature signal of interest is estimated from measurements provided by two thermocouples 14 that are not measuring the variable of interest, but are measuring process variables that are related to it.

Next, in step 104, a history of the process is created. Creating a history of a process is done by building an adaptive time-series model incorporated in a state space form or the like for predicting the variable at the next sampling time.

Given the state x(k) of a respective thermocouple 14 at a sampling period, we need to predict the value x(k+1) at the next sampling period. This can be done using state space models or time series models. Most thermocouple failure schemes tend to incorporate the thermocouple model into the state space model of the overall process. However, this can be complicated and expensive. An alternate approach is the use of adaptive time series prediction. For the time-series prediction, the state of the variable at the next sampling period is assumed to be of the form $$x(k+1)=x(k)+u(k)+w(k)$$

where u(k) is the unknown input to be estimated and w(k) is noise. x(k) and w(k) are independent, random and Gaussian distributed. Polynomials (linear, quadratic and cubic), neural networks and fuzzy logic techniques can be used to estimate u(k). The main difference between these methods is architecture and the adaptation process is similar.

$$x(k+1)=x(k)+u(k)+w(k) \qquad \text{Equation 1}$$

Equation 1 represents the time series model. Here, x(k) is the temperature being measured by a respective thermocouple 14, u(k) is an unknown input that causes a change in temperature being measured between two samples, this is estimated, and w(k) is zero mean white noise and represents the error in this model. Note that each thermocouple set has a separate variable x(k).

There are a number of methods by which the unknown input can be estimated. In one embodiment, a line prediction (changes between two samples is represented by fitting a line) is utilized.

Here, u(k) is approximated as $$u(k) = a \cdot t + b = [a \ b] \begin{bmatrix} t \\ 1 \end{bmatrix} = \theta^T \phi(k)$$

where t is the time difference between the two samples. The two constants for the line fit: a the slope coefficient and b the x intercept are constantly adapted. Note that in this kind of adaptive prediction scheme the samples do not necessarily have to arrive at regular intervals. The quadratic and the spline fit could also have been used $$u(k) = a \cdot t^2 + b \cdot t + c$$

$$u(k) = a \cdot t^3 + b \cdot t^2 + c \cdot t + d$$

The adaptation is carried out by using the Parameter Adaptation Algorithm (PAA) and is given by the following algorithm:

The a priori and a posteriori predicted outputs are a priori $\hat{x}^o(k+1) = \hat{\theta}^T(k)\phi(k)$ a posteriori: $\hat{x}(k+1) = \hat{\theta}^T(k+1)\phi(k)$ The a priori and a posteriori prediction errors are a priori: $\epsilon^o(k+1) = x(k+1) - \hat{x}^o(k+1)$ a posteriori: $\epsilon(k+1) = x(k+1) - \hat{x}(k+1)$ respectively. The parameters are adapted on-line using $$\hat{\theta}(k+1) = \hat{\theta}(k) + F(k+1) \cdot \phi(k) \cdot \epsilon^o(k+1)$$

where $$F(k+1) = \frac{1}{\lambda_1(k)} \left[ F(k) - \frac{F(k) \cdot \phi(k) \cdot \phi^T(k) \cdot F(k)}{\lambda_1(k)/\lambda_2(k) + \phi^T(k) \cdot F(k) \cdot \phi(k)} \right]$$

where $\lambda_1$ and $\lambda_2$ are forgetting factors. The stability of the PAA scheme can be guaranteed by taking $0 \leq \lambda_2 \leq 2$ and $0 \leq \lambda_1 \leq 1$. Normally, $\lambda_1$ and $\lambda_2$ are chosen such that the ratio $\lambda_1(k)/\lambda_2(k)$ lies between 0.5 and 1. The initial condition to bootstrap the recursive estimation procedure is $F(0) = \gamma I$, where $\gamma$ is a large positive number. The sequential least square can also be interpreted as a Kalman filter for a process with no uncertainty.

Next, at step 106, thermocouple 14 readings are validated. The validation cycle (i.e., steps carried out between two sampling points) consists of predicting the value of the variable being estimated, measuring, creating redundant estimates, validating, fusing multiple estimates, and updating the value of the variable being estimated. Abrupt thermocouple failures are detected through the validation gate (a region based on the expected distribution); incipient thermocouple failures are detected by monitoring the thermocouple residues.

Changes in the statistical properties of the thermocouple residue are used to detect faults in the thermocouple. Since each thermocouple has its own residue signal, simultaneous, multiple thermocouple failures can be detected.

This is part of the estimation process where a decision has to be made whether the readings from a thermocouple should be considered for the estimation process. To accomplish this, a "validation gate" is defined. This validation gate defines a region where we expect the estimate for the temperature to lie with a high degree of confidence. Thermocouple measurements that lie within this gate are considered valid, and those outside the gate are too far from expected and are discarded.

Next, the redundant estimates and the predicted values are combined to generate a fused thermocouple value.

Mathematically, the process for each of the temperature measurements x is represented as:

$$x(k+1) = x(k) + u(k) + w(k)$$

$$y(k) = x(k) + v(k)$$

where y(k) is the thermocouple reading, v(k) is the measurement noise. The initial state is not known, but the following probabilistic information about x(0), w(k) and v(k) are known. x(k), w(k) and v(k) is independent, random, and Gaussian distributed.

We begin by assuming the measurement variable is normally distributed, $$N(x(0); P(0|0) = X_0, \hat{x}(0|0) = x_0)$$

$$E[x(0)] = x_0, E[(x(0) - x_0)(x(0) - x_0)^T] = X_0$$

$$E[w(k)] = 0, E[w(k)w^T(j)] = Q(k)\delta_{kj}$$

$$E[v(k)] = 0, E[v(k)v^T(j)] = R(k)\delta_{kj}$$

$$E[(x(0) - x_0)w^T(k)] = 0, E[(x(0) - x_0)v^T(k)]0$$

$$E[w(k)v^T(k)] = 0 \text{ for all } k \text{ and } j$$

We begin at time k, where all the thermocouple readings at time k have been taken into account. Our estimate for the measurement variable is given by $N(x(k); P(k|k), \hat{x}(k|k))$. Using the state transition model we make a prediction for the state of the variable at the next sampling period. This is given by the following distribution for our estimate $$N(x(k+1); P(k-1|k), \hat{x}(k+1|k)) = N(x(k+1); P(k|k) + Q, \hat{x}(k|k) + \hat{\theta}^T(k)\phi(k))$$

This is the part of the estimation process where a decision has to be made as to whether the readings from a thermocouple should be considered for the estimation process. For this purpose we first calculate the expected distribution for the ith thermocouple reading belonging to the set (there are three thermocouples belonging to each set). This is given by $$N(y_i(k+1); S_i(k+1), \hat{y}_i(k+1)) = N(y_i(k+1); P(k+1|k) + R_i, \hat{x}_i(k+1|k))$$

To validate the thermocouple readings we use the principle of validation. We define a region where there is a high probability that the readings will lie.

Let, $v_i \triangleq (y_i(k+1) - \hat{y}_i(k+1))$

Based on this expected distribution, a region can be defined in the measurement space where there is a high probability that the measurement will be found (e.g., a 3 sigma bound corresponds to a confidence of 99.8%)

$$\tilde{V}_{k+1}(\gamma) \triangleq \{y_i : [y_i(k+1) - \hat{y}(k+1)]S^{-1}(k+1)[y_i(k+1) - \hat{y}_i(k+1)] \le \gamma\}$$

Measurements that lie within the gate are considered valid; those outside are too far from the expected so are discarded. A decision has to be made as to whether the readings from a respective thermocouple 18 should be considered for the estimation process.

For each thermocouple variable:

Thermocouple Residue=fused estimate−thermocouple readings

The statistical properties of these residues are then used to detect failed thermocouples. Ideally, residues for the thermocouples should have zero mean and variance equal to its variance when it is functioning normally. The deviation from zero is due to noise and faults. Thermocouple failure causes a change in the mean and variance of the thermocouple residue indicating bias in the thermocouple signal and degradation of thermocouple respectively. The thermocouple confidence can be used to mark a thermocouple measurement as being faulty. A long term trend in low thermocouple confidence is a symptom of a failing thermocouple.

Next, the thermocouple confidence 22 of a respective thermocouple 14 is calculated by the similarity of a thermocouple reading to the fused distribution for the variable. Normally, thermocouple confidence measures are given in terms of a metric (distance) between two probability density functions. The numeric value of thermocouple confidence represents the closeness between two distributions. We use a scale of 0 and 1, where 0 implies completely independent distributions, while 1 implies identical distributions.

Thermocouple confidence is calculated by the following formula:

$$\text{Sensor Confidence}_i(k) = \sqrt[4]{2 \cdot P(k|k) \cdot R_i} \left(\sqrt{P(k|k) + R_i}\right)^{-1} \exp\left(-\frac{(\hat{x}(k|k) - y_i(k))^2}{4 \cdot (P(k|k) + R_i)}\right)$$

Lastly, the confidence value for a thermocouple in all the three sets that it belongs to is considered. If the thermocouple confidence in all the three sets is 0 for a particular reading then it is considered a failed thermocouple for that reading.

Next, we will briefly review a few cases that demonstrates the efficacy of our invention.

EXAMPLE 1

Results for Example 1 were obtained using actual data from thermocouple outputs of a Gas Turbine engine. In this case, as shown in FIG. 2, the calculated value for an adjacent thermocouple shows an invalid thermocouple indicated in snapshot 2. The thermocouple confidence for this thermocouple becomes zero and is therefore not used in estimating the fused value for thermocouple #18. FIG. 2 shows the measured thermocouple value and the estimated value for Thermocouple #18. The invalid thermocouple signal for the failed thermocouple never recovers over the 900 snapshots for this case. The system correctly identifies a single thermocouple failure and isolates its effects.

EXAMPLE 2

With Meta Reasoning

Figure 3:
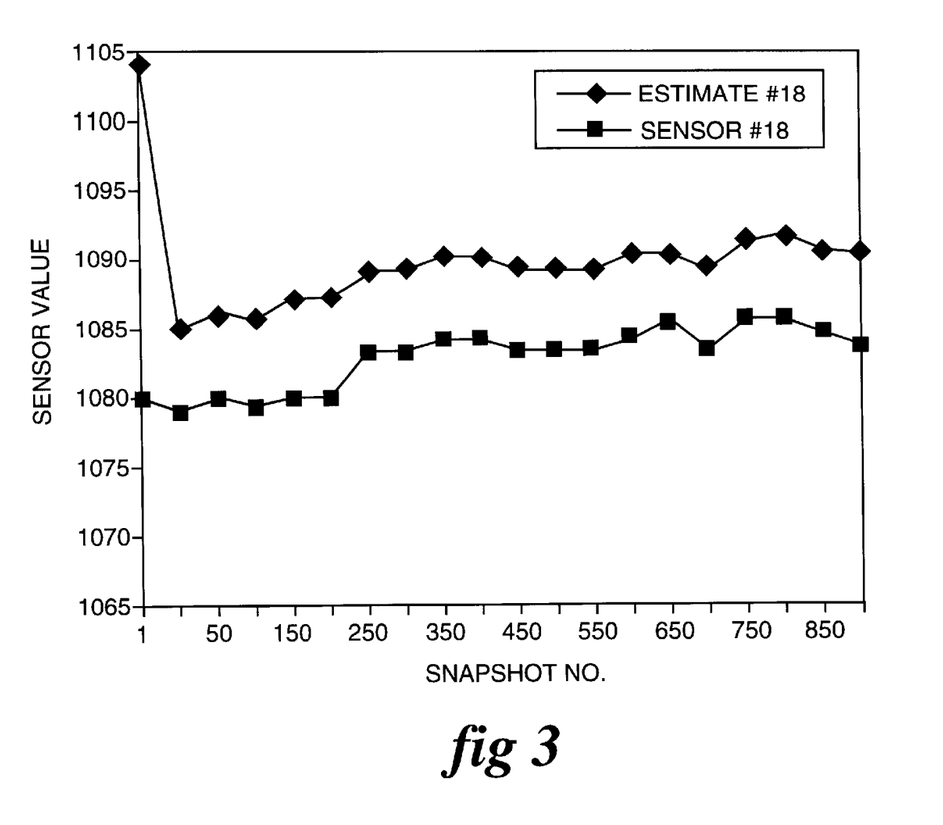
FIG. 3 is a graphical representation of measured and estimated thermocouple values in accordance with one embodiment of the instant invention.

Results are obtained using the same failed thermocouple data from a file of 90 snapshots. In this case, results are similar to the above example with the calculated value for an adjacent thermocouple showing an invalid thermocouple in snapshot 2. The belief value for this thermocouple becomes zero effecting the thermocouple #18 estimate. FIG. 3 shows the measured and estimated values for thermocouple #18 over the 90 snapshots for this example.

EXAMPLE 3

Flashback

Figure 4:
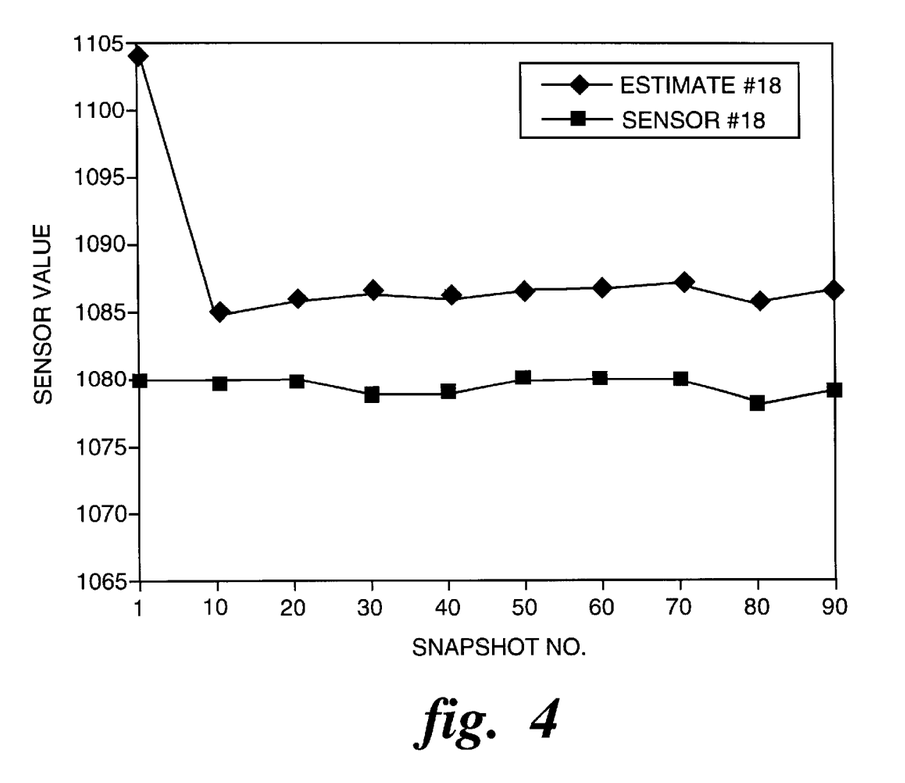
FIG. 4 is a graphical representation of measured and estimated thermocouple values in accordance with one embodiment of the instant invention.

Results are obtained using actual data from a thermocouple exposed to a flashback condition in an operating Gas Turbine. In this case, calculated value for an adjacent thermocouple shows an invalid thermocouple in Snapshot 324, as shown in FIG. 4. This brings the belief value for this thermocouple to zero, resulting in a change in the fused estimate for Thermocouple #20. In the next snapshot (325), the calculated value for a second adjacent thermocouple (#20) also indicates an invalid thermocouple, resulting in a change in the fused estimate for Thermocouple #19 because the belief value for Thermocouple #20 becomes zero. In this case, the thermocouple for calculated value for Thermocouple #20 comes back at snapshot 334 and the thermocouple for calculated value for Thermocouple #19 comes back at snapshot 335 resulting in the estimates for Thermocouples #19 and #20 returning to normal or expected values after snapshot 390 as shown in FIG. 4. This case is an example of multiple thermocouple failure following a flashback incident. As shown, our system can correctly distinguish between a flashback and a thermocouple failure. Multiple thermocouple failures are also correctly handled.

EXAMPLE 4

Faulty Thermocouple

Figure 5:
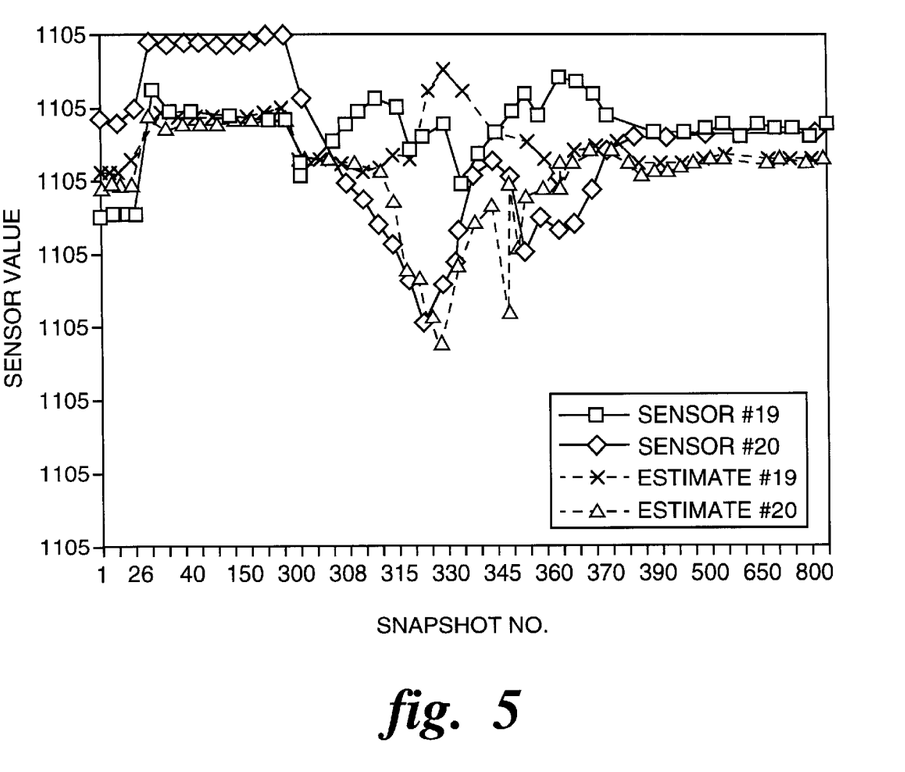
FIG. 5 is a graphical representation of measured and estimated thermocouple values in accordance with one embodiment of the instant invention.

Results are from thermocouple outputs of a Gas Turbine installation. In this case, the measured parameter for Thermocouple #13 shows an invalid thermocouple at snapshot 302 and the measured value for thermocouple #13 drops as shown in FIG. 5. The measured parameter for Thermocouple #13 comes back to its normal value around snapshot 450, however, the invalid thermocouple flag always remains true. Since the fused estimate for thermocouple #13 is calculated using calculated values for thermocouple #12 and #14 as well as the measured value for thermocouple #13, the estimated thermocouple value remains reasonable even though the belief for thermocouple #13 falls to zero. This shows the ability of the thermocouple validation method to provide estimates of actual thermocouple measurements even when the thermocouple has failed.

EXAMPLE 5

Figure 6:
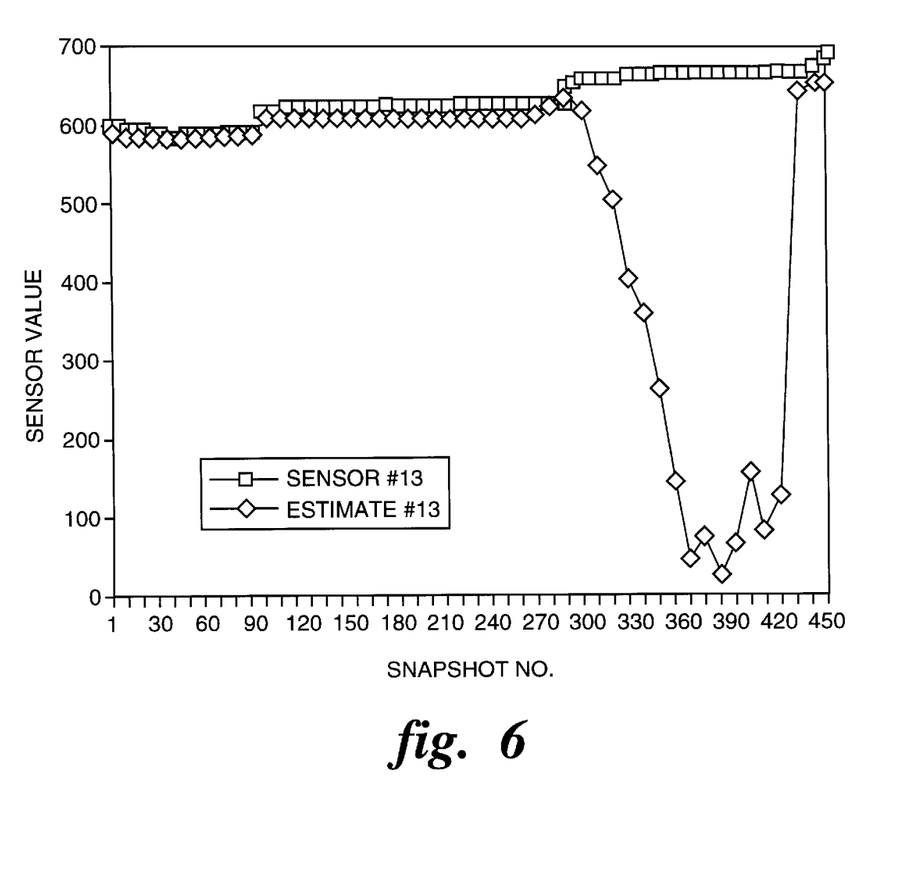
FIG. 6 is a graphical representation of measured and estimated thermocouple values in accordance with one embodiment of the instant invention.

Results are obtained from the thermocouple outputs of a Gas Turbine installation. The thermocouple for calculated value for Thermocouple #17 becomes invalid at snapshot 2 and brings the belief value for calculated parameter for Thermocouple #17 to zero. This effects the calculation of a fused estimate for Thermocouple #18 and is shown in FIG. 6 as a comparison with the measured value. The invalid thermocouple never comes back in this case.

EXAMPLE 6

Flashback with Failure Data Overlayed

Figure 7:
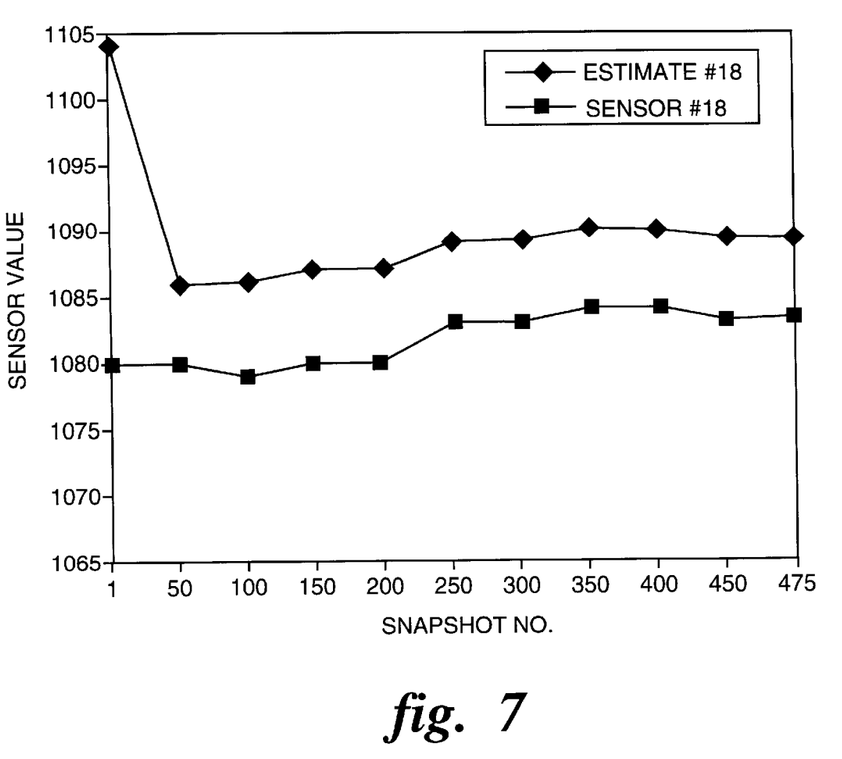
FIG. 7 is a graphical representation of measured and estimated thermocouple values in accordance with one embodiment of the instant invention.
Figure 8:
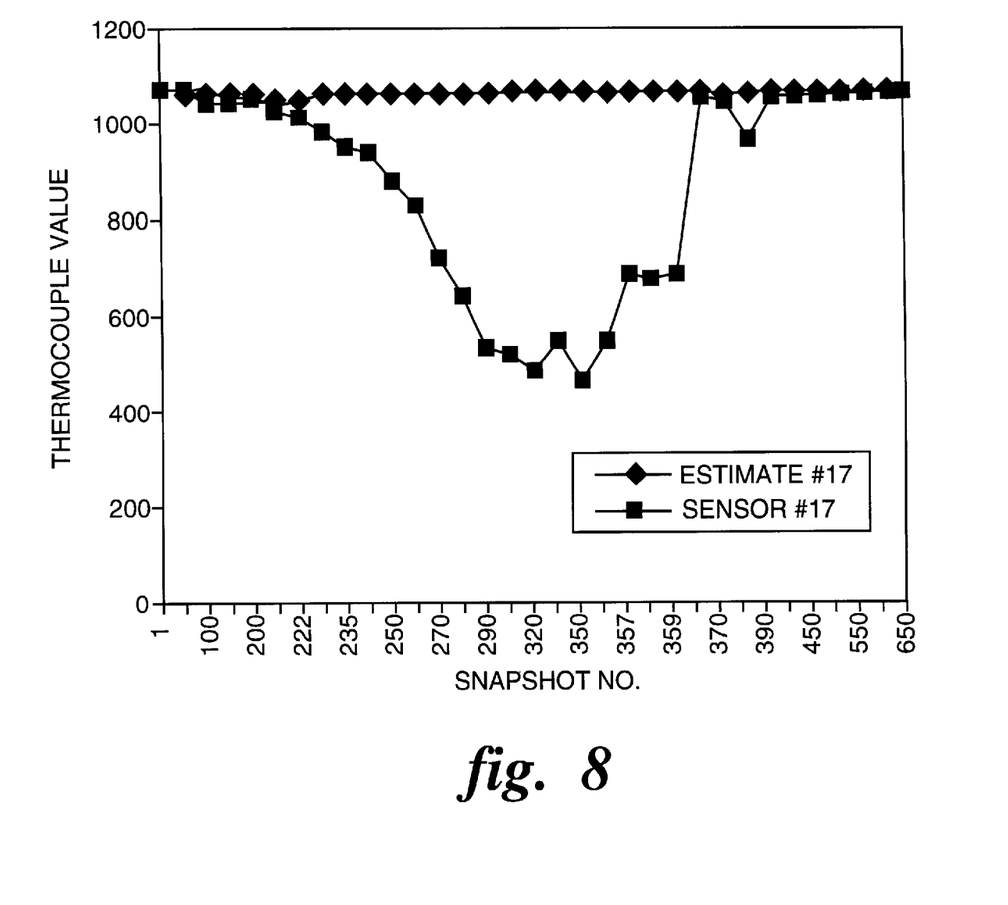
FIG. 8 is a graphical representation of measured and estimated thermocouple values in accordance with one embodiment of the instant invention.

Results are obtained from the thermocouple outputs of a Gas Turbine installation. In this case the thermocouple #17 corresponding to it's measured parameter fails at snapshot 226 after which the measured thermocouple value falls as shown in FIG. 7. The thermocouple comes back at snapshot 381. Calculated values and also show an invalid thermocouple around the same points where thermocouple #17 shows an invalid thermocouple. However, the fused estimate for thermocouple #17 which is calculated using data from calculated values thermocouple #16 and thermocouple #18 and measured value for thermocouple #17 remains reasonably valued even with the presence of a failed thermocouple (belief value for thermocouple #17 is zero when thermocouple fails).

While only certain features of the invention have been illustrated and described, many modifications and changes will occur to those skilled in the art. It is, therefore, to be understood that the appended claims are intended to cover all such modifications and changes as fall within the true spirit of the invention.

We claim:

1. A method of thermocouple failure detection in power generation turbines comprising:

creating redundancy estimates from temperature readings generated by said thermocouples;

predicting an expected value from each temperature reading;

comparing said temperature readings and said redundancy estimates with said expected value;

fusing said redundancy estimates and said expected values to generate a fused thermocouple value;

and generating a thermocouple confidence by comparing said fused thermocouple value and said temperature readings;

wherein said predicting of expected values is completed by creating a history of the process.

2. A method in accordance with claim 1, wherein said redundancy estimates are created by physical redundancy using multiple thermocouples to monitor the same temperature.

3. A method in accordance with claim 1, wherein said redundancy estimates are created by functional redundancy using measurements from non-redundant thermocouples to estimate temperature.

4. A method in accordance with claim 3, wherein said functional redundancy is represented as $x_i = f(y_1, --- y_{i-1}, y_{i+1}, --- y_n)$ where $y_1, y_2 --- y_n$ are measurements from n thermocouples measuring temperatures at the point each respective thermocouple is located, $x_i$.

5. A method in accordance with claim 4, wherein said function is solved using nonlinear regression.

6. A method in accordance with claim 4, wherein said function is solved using a neural network.

7. A method in accordance with claim 4, wherein said function is solved using an analytical first principal model.

8. A method in accordance with claim 3, wherein said functional redundancy estimates are created by monitoring temperature signals at two adjoining thermocouples, one on either side of an at-issue thermocouple.

9. A method in accordance with claim 1, wherein said history is created by building an adaptive time-series model incorporated in a state space form for predicting variables at a next sampling time.

10. A method in accordance with claim 9, wherein the state of the variable of said next sampling period is:

$x(k+1) = x(k) + u(k) + w(k)$ where $u(k)$ is an unknown input to be estimated, $w(k)$ is noise, and $x(k)$ is the temperature detected by a respective thermocouple.

11. A method in accordance with claim 10 wherein $x(k)$ and $w(k)$ are independent, random and Gaussian distributed.

12. A method in accordance with claim 10, wherein $u(k)$ is estimated using a polynomial technique.

13. A method in accordance with claim 10, wherein $u(k)$ is estimated using a neural network.

14. A method in accordance with claim 10, wherein $u(k)$ is estimated using a fuzzy logic technique.

15. A method in accordance with claim 1, wherein comparing said temperature readings and said redundancy estimates with said expected value is completed using a validation gate.

16. A method in accordance with claim 15, wherein said validation gate is defined by a 3 sigma area.

17. A method in accordance with claim 1, wherein said thermocouple confidence is calculated for each thermocouple within each set of thermocouples that a respective thermocouple belongs.

18. A method in accordance with claim 17, wherein a failed thermocouple is detected if the thermocouple confidence for a respective thermocouple is zero in each set of thermocouples that a respective thermocouple belongs.

19. A thermocouple failure detection system (10) for a power generation turbine assembly (12) comprising:

a plurality of thermocouples (14) positioned to monitor temperature within said turbine assembly (12); and a computer (16) coupled to said plurality of thermocouples (14);

wherein temperature signals generated by respective thermocouples (14) are provided to said computer (16) and utilized within an algorithm that is embedded within said computer to generate a thermocouple confidence value, which value provides an indication of thermocouple operation or alternatively thermocouple failure;

wherein said algorithm is performed in a language selected from the group consisting of C, C++, JAVA, basic, Visual Basic, MATLAB, and Fortran.

20. A system in accordance with claim 19, wherein said computer is selected from the group consisting of a mainframe, a microcomputer, a minicomputer and a supercomputer.

21. A system in accordance with claim 19 wherein said algorithm comprises a method of thermocouple failure detection in power generation turbines comprising:

creating redundancy estimates from temperature readings generated by said thermocouples;

predicting an expected value from each temperature reading;

comparing said temperature readings and said redundancy estimates with said expected value;

fusing said redundancy estimates and said expected values to generate a fused thermocouple value;

and generating a thermocouple confidence by comparing said fused thermocouple value and said temperature readings.

22. A system in accordance with claim 21, wherein said redundancy estimates are created by physical redundancy using multiple thermocouples to monitor the same temperature.

23. A system in accordance with claim 21, wherein said redundancy estimates are created by functional redundancy using measurements from non-redundant thermocouples to estimate temperature.

24. A system in accordance with claim 23, wherein said functional redundancy is represented as $x_i = f(y_1, --- y_{i-1}, y_{i+1}, --- y_n)$ where $y_1, y_2 --- y_n$ are measurements from n thermocouples measuring temperatures at the point each respective thermocouple is located, $x_i$.

25. A system in accordance with claim 24, wherein said function is solved using nonlinear regression.

26. A system in accordance with claim 24, wherein said function is solved using a neural network.

27. A system in accordance with claim 24, wherein said function is solved using an analytical first principal model.

28. A system in accordance with claim 23, wherein said functional redundancy estimates are created by monitoring temperature signals at two adjoining thermocouples, one on either side of an at-issue thermocouple.

29. A system in accordance with claim 21, wherein said predicting of expected values in completed by creating a history of the process.

30. A system in accordance with claim 29, wherein said history is created by building an adaptive time-series model incorporated in a state space form for predicting variables at next sampling time.

31. A system in accordance with claim 30, wherein the state of the variable of said next sampling period is:

$x(k+1)=x(k)+u(k)+w(k)$ where $u(k)$ is an unknown input to be estimated, $w(k)$ is noise, and $x(k)$ is the temperature detected by a respective thermocouple.

32. A system in accordance with claim 31 wherein $x(k)$ and $w(k)$ are independent, random and Gaussian distributed.

33. A system in accordance with claim 31, wherein $u(k)$ is estimated using a polynomial technique.

34. A system in accordance with claim 31, wherein $u(k)$ is estimated using a neural network.

35. A system in accordance with claim 31, wherein $u(k)$ is estimated using a fuzzy logic technique.

36. A system in accordance with claim 21, wherein comparing said temperature readings and said redundancy estimates with said expected value is completed using a validation gate.

37. A system in accordance with claim 21, wherein said validation gate is defined by a 3 sigma area.

38. A system in accordance with claim 21, wherein said thermocouple confidence is calculated for each thermocouple within each set of thermocouples that a respective thermocouple belongs.

39. A system in accordance with claim 38, wherein a failed thermocouple is detected if the thermocouple confidence for a respective thermocouple is zero in each set of thermocouples that a respective thermocouple belongs.

* * * * *